(No Model.)

J. P. NIEMANN.
WHIP SOCKET.

No. 325,563.          Patented Sept. 1, 1885.

Witnesses.
C. W. Benjamin
Robert J. Kirk Jr.

Inventor
James P. Niemann
J. S. McGiehan
Atty.

UNITED STATES PATENT OFFICE.

JAMES P. NIEMANN, OF BROOKLYN, ASSIGNOR TO JOHN W. FOULKS, OF NEW YORK, N. Y.

WHIP-SOCKET.

SPECIFICATION forming part of Letters Patent No. 325,563, dated September 1, 1885.

Application filed April 28, 1885. (No model.)

*To all whom it may concern:*

Be it known that I, JAMES P. NIEMANN, of Brooklyn, in the county of Kings and State of New York, have invented a new and useful Improvement in Whip-Sockets, of which the following is a specification.

This invention relates to whip-sockets, and has for its object to provide a whip-socket with a rubber which is detachable, and which is held firmly in position by its own conformation, as will be hereinafter more fully explained.

Figure 1:
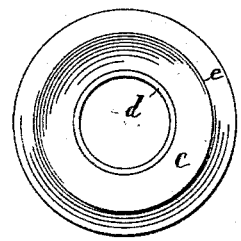
Figure 2:
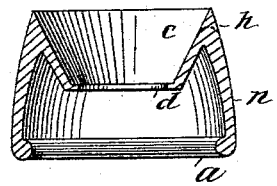

The accompanying drawings, which form part of this specification, illustrate my invention in three views, Figure 1 being a top or plan view of the rubber; Fig. 2, a vertical section through the center of the rubber, and Fig. 3 a portion of the whip-socket to which the rubber is attached.

Figure 3:
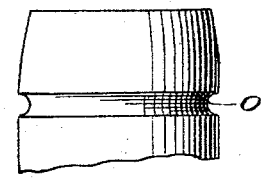

I am aware that whip-sockets have been heretofore made with rubber attachments for holding the whips in place, but such rubbers, as a rule, are secured to the interior of the socket, and in many cases will cling more firmly to the butt of the whip than to the socket, and thus in removing the whip from the socket the rubber will be withdrawn and becomes useless. By the aid of my improved rubber this difficulty is entirely overcome, as will be seen by the following description:

The whip-socket is of the usual kind, as shown by Fig. 3. The rubber, as shown at Fig. 2, is provided with an inwardly-projecting bead, $a$, which fits in the circular groove $o$ of the socket. The rubber being a little smaller in diameter than the socket, it will of course retain its position sufficiently firm to resist any strain necessary. The upper side of the rubber is provided with an inverted-cone portion, $c$, as shown in Figs. 1 and 2. The lower opening, $d$, of this cone portion is made the requisite size to admit the butt of the whips. The upper opening is of any desired size.

One of the principal features of my improved rubber is in carrying the outside surface of the rubber and the cone up far enough to form the sharp edge $e$, as this edge acts as a brace to throw the cone down again in position after the whip has been withdrawn. I have on several occasions made the upper edge round, as shown by the dotted lines at $h$, Fig. 2, but found they would not answer, as the cone would not replace itself again after having been drawn up by the withdrawal of the whip.

The length of the inverted cone and also the distance from the bead $a$ to the edge $e$, can be changed, and the result will be the same. The rubber can, if desired, be made with short sides, so that the cone portion will extend within the socket, which may be an advantage under some circumstances.

Having thus described my improved whip-socket, what I claim, and desire to secure by Letters Patent, is—

1. A whip-socket rubber constructed with the inwardly-projecting bead $a$, adapted to hold said rubber in position, and inverted cone $c$, as and for the purpose specified.

2. A whip-socket rubber constructed with the bead $a$, as described, and the inverted cone $c$, constructed to form, with the side $h$, the apex edge $e$, as described, and for the purposes herein set forth.

In testimony that I claim the foregoing improvement in whip-sockets, as above described, I have hereunto set my hand this 2d day of January, 1885.

JAMES P. NIEMANN.

Witnesses:
WILLIAM KELLY,
ROBERT J. KIRK, Jr.